United States Patent Office 3,613,163
Patented Oct. 19, 1971

3,613,163
PRESSES
Cyril Kennerley, Middlewich, England, assignor to E.R.F.
Engineering Limited, Biddulph Moor, Stoke-on-Trent,
England
Filed Mar. 20, 1969, Ser. No. 808,951
Claims priority, application Great Britain, Mar. 22, 1968,
13,937/68
Int. Cl. B30b 1/34
U.S. Cl. 18—16 R                                      8 Claims

ABSTRACT OF THE DISCLOSURE

A press comprising a table mounting a lower platen, an upper platen connected with the table via chains and pulleys, a ram for moving the table between a loading position and a position in which a pressing operation can be effected, and at least one ram for moving the lower platen relative to the table to effect a pressing operation.

---

This invention relates to presses, particularly but not exclusively for moulding articles, for example, for cold moulding synthetic plastics articles.

An object of the present invention is to provide an improved form of moulding press which is economic to produce.

According to the present invention, there is provided a moulding press comprising upper and lower press platens movable towards and away from each other, a movable support carrying the lower press platen, primary means for moving the movable support and the upper press platen towards and away from each other so that the lower press platen is moved between a loading position and a position in which a pressing operation can be effected, secondary means for moving the lower press platen relative to the support and towards the upper press platen to effect the pressing operation, and means connecting said upper press platen for movement with the movable support so as to at least partially counter-balance the movable support and lower press platen.

Figure 1:
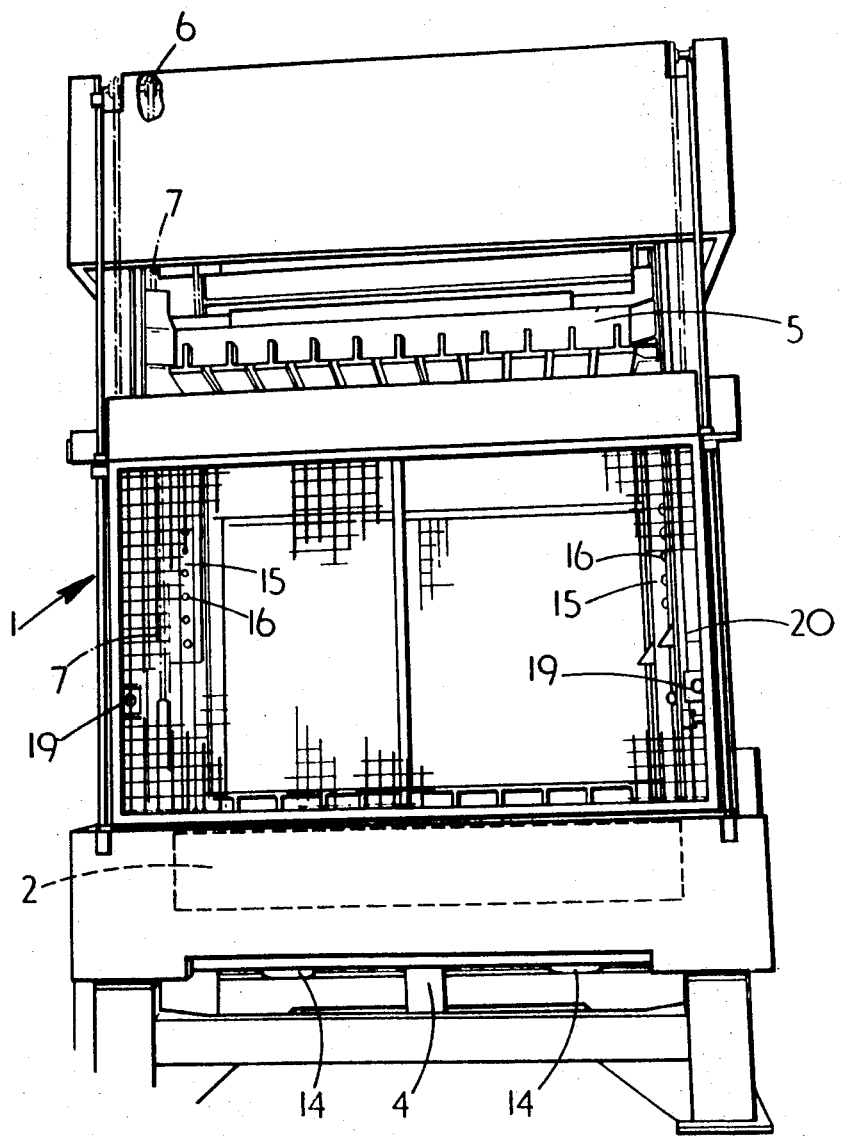
Figure 2:
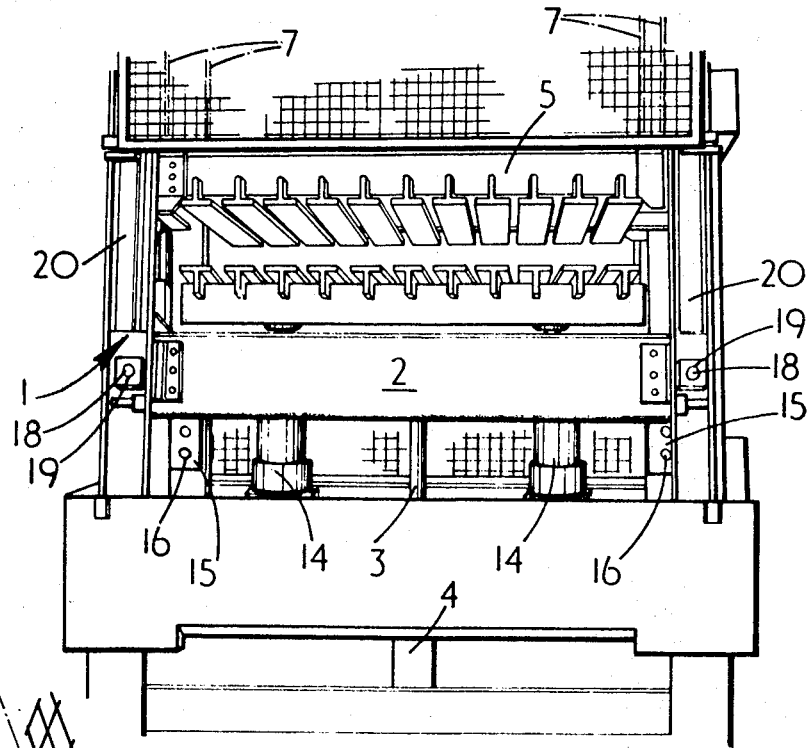
Figure 3:
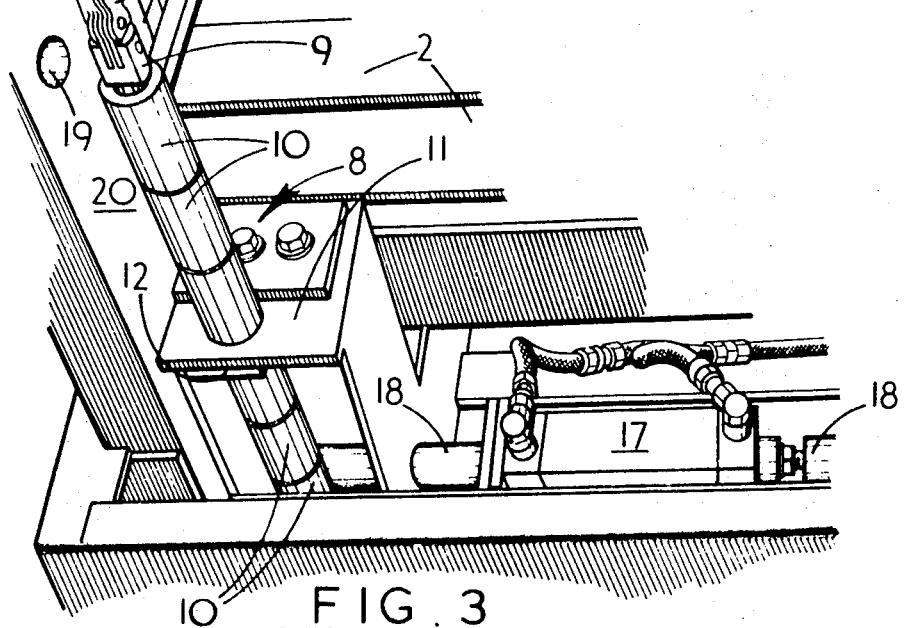

An embodiment of the present invention will now be described, by way of example, with reference to the accompanying drawing in which:

FIG. 1 is a front perspective view of a moulding press according to the present invention, in a loading position, FIG. 2 is a front perspective view of the press shown in FIG. 1, in an operating position, and FIG. 3 is a detail view of part of the press of FIGS. 1 and 2, showing a locking device and a device for adjusting the daylight between the press platens.

The press, which is for cold moulding synthetic plastics workpieces, comprises a main frame 1, a horizontal table 2 mounted in the frame 1 for movement in a vertical plane on the piston rod 3 of a vertically disposed, long stroke pneumatic piston and cylinder device 4. An upper press platen 5 is carried above the table 2 on four pulleys 6 (only one shown), one pulley at each top corner of the frame 1. Chains 7 pass over the pulleys 6 and are each attached at one end to the upper press platen 5 and at the other end to the table 2 through the intermediary of a device, indicated generally by arrow 8 (see particularly FIG. 3), for adjusting the maximum spacing between the press platens.

Each device 8 comprises a bar 9 carrying a series of spacers 10. The bar 9 carrying the spacers 10 passes through an aperture in a flange 11 carried by the table 2 and a removable C plate 12 is provided under the flange 11. The C plate 12 is inserted between two adjacent spacers 10 and serves to prevent the chain 7 from being disengaged from the table 2. It will be manifest that the maximum distance between the table 2 and the platen 5 can be selected by locating the C plate 12 between an appropriate pair of spacers 10.

Extension of the piston rod 3 of the pneumatic piston and cylinder device 4 causes the table 2 and the upper press platen 5 to move together by an equal amount to an operating position in which is a pressing operation can be effected whilst retraction of the piston rod 3 causes the table 2 and upper press platen 5 to move apart by an equal amount to a loading position.

A lower press platen 13 is supported on the table 2 through the intermediary of a pair of relatively short stroke, vertically disposed hydraulic piston and cylinder devices 14. The hydraulic piston and cylinder devices 14 are adapted to move the lower press platen 13 from a position in which it is lying on the table 2 (see FIG. 1) to a position in which it is spaced above the table 2 (see FIG. 2).

Depending from each corner of the upper press platen 5 is a beam 15 (only two shown) having a series of apertures 16 therein. On each side of the table 2 there is provided a pneumatic piston and cylinder device 17 to which is attached a pair of bolts 18, one bolt at each end of the piston and cylinder device 17. A bolt hole 19 is provided in each of four vertical girders 20 forming part of the frame 1. The piston and cylinder devices 17, bolt 18, apertured beams 15 and bolt holes 19 form a device for locking the upper press platen 5 and the table against movement as will be described in more detail hereinafter.

In operation, the C plate 12 is engaged in between the appropriate pair of spacers 10 to give the desired spacing between the platens 5 and 13 when the table 2 is in the loading position. The piston rod 3 of the pneumatic piston and cylinder device 4 is retracted with the hydraulic piston and cylinder devices 4 retracted so that the table is lowered into the loading position i.e. until the lower press platen 13 is in a position in which a workpiece (not shown) to be moulded can be conveniently loaded on to the lower press platen 13. The table 2 and the upper press platen 5 are then moved together to the operating position by the pneumatic piston and cylinder device 4. The lower press platen 13 is then at a convenient height for an operator to observe the pressing operation, whereupon the locking device is operated to lock the upper press platen 5 relative to the table 2 in a position in which a pressing operation can be commenced. This locking operation is effected by operating the pneumatic piston and cylinder devices 17 which cause the bolts 18 to move outwardly so that they pass through corresponding apertures 16 in the beams 15 and engage in the bolt holes 19 in the girder 20.

Finally, the hydraulic piston and cylinder devices 14 are operated to raise the lower press platen 13 towards the fixed upper press platen 5 to effect the pressing operation. Thereafter, the lower press platen 13 is returned to its lower position in which it lies against the table 2, the locking device is released by retracting the bolts 18, and the table 2 lowered to a position in which the moulded article produced can be easily removed from the lower press platen 13.

A safety inerlock system (not shown) is provided for preventing operation of the hydraulic piston and cylinder devices except when the platens are in the correct position.

It is considered that a press according to the present invention is particularly suitable for moulding relatively large articles such as components for the cab bodies of goods vehicles.

It will be appreciated that in a press according to the present invention the use of one or more costly, relatively long stroke high pressure pistons is obviated and that the weight of the upper press platen at least partly counterbalances the weight of the table and lower press platen so as to reduce the force required to effect initial movement of the platens.

It will be manifest that, in the embodiment described above, the ratio of movement of the upper platen to the movement of the lower platen is 1:1. In cases where a deep article is being moulded it may be desirable to arrange for this ratio to be greater than 1:1 by incorporating a pulley system or the like in the connection between the platens.

If desired, a press according to the present invention may be completely hydraulically operated.

What is claimed is:

1. A moulding press comprising upper and lower press platens movable towards and away from each other, a movable support carrying the lower press platen, primary means for moving the movable support and the upper press platen towards and away from each other so that the lower press platen is moved between a loading position and a position in which a pressing operation can be effected, secondary means for moving the lower press platen relative to the support and towards the upper press platen to effect the pressing operation, and means connecting said upper press platen for movement with the movable support so as to at least partially counterbalance the movable support and lower press platen.

2. The moulding press as claimed in claim 1, wherein at least one means is provided for locking the upper press platen relative to the movable support.

3. The moulding press as claimed in claim 2, wherein each locking means comprises a beam having a plurality of apertures therein depending from the upper press platen, and movable bolt means attached to the movable support and adapted to pass through one of the apertures in the beam.

4. The moulding press as claimed in claim 3, wherein four bolts are provided, two on each side of the table, and a pair of piston and cylinder devices as adapted to move the bolt means.

5. The moulding press as claimed in claim 3, wherein a main frame supports the movable support and the upper press platen and the movable bolt means is adapted to engage an aperture in the main frame in order to lock the movable support and upper press platen relative to the frame.

6. The moulding press as claimed in claim 1, wherein the means connecting the upper press platen for movement with the movable support comprises a chain and pulley arrangement.

7. The moulding press as claimed in claim 1, wherein means are provided for adjusting the spacing between the platens when the lower press platen is in its loading position.

8. The moulding press as claimed in claim 1, wherein the primary and secondary means are piston and cylinder devices.

References Cited

UNITED STATES PATENTS

| | | | |
|---|---|---|---|
| 1,778,803 | 10/1930 | Hubbert | 18—16 H |
| 1,800,849 | 4/1931 | Stacy | 18—16 H |
| 2,319,479 | 5/1943 | Ryder | 18—16 RX |
| 2,386,641 | 10/1945 | Trockle et al. | 18—16 H |
| 2,467,440 | 4/1949 | Melay et al. | 18—17 R |
| 2,692,407 | 10/1954 | Stacy | 18—16 H |
| 2,812,543 | 11/1957 | Stacy | 18—16 H |
| 2,916,768 | 12/1959 | Quere et al. | 18—30 LV |
| 2,983,953 | 5/1961 | Borah | 18—16 F |
| 3,204,292 | 9/1965 | Schon | 18—16 F |
| 3,343,218 | 9/1967 | Borah | 18—16 F |
| 3,465,386 | 9/1969 | Brown | 18—16 RX |

J. HOWARD FLINT, Jr., Primary Examiner